O. P. SCHIEMENTZ.
AUTOMATIC NUT TAPPING MACHINE.
APPLICATION FILED MAR. 4, 1911.

1,020,451.

Patented Mar. 19, 1912.

Witnesses:

Otto Paul Schiementz, Inventor.

UNITED STATES PATENT OFFICE.

OTTO PAUL SCHIEMENTZ, OF CHEMNITZ, GERMANY.

AUTOMATIC NUT-TAPPING MACHINE.

1,020,451.  Specification of Letters Patent.  Patented Mar. 19, 1912.

Application filed March 4, 1911. Serial No. 612,354.

*To all whom it may concern:*

Be it known that I, OTTO PAUL SCHIEMENTZ, a subject of the German Emperor, and a resident of Chemnitz, in the Kingdom of Saxony, Empire of Germany, have invented certain new and useful Improvements in Automatic Nut-Tapping Machines, of which the following is a specification.

The present invention is an automatic nut tapping machine, the screw spindle of which, being horizontally arranged, bears a tap at each end and moves in the direction of its axis forward and backward, according as the fore or hind screw tap is working. For each screw tap there is arranged a feed contrivance for the nuts and a stop arrangement for the same during the tapping.

All known nut tapping machines cannot be called automatic inasmuch as they presuppose that a person is always present when the machine is in action, in order to supply the machine with nuts.

The present applicant proposes to do away with human aid in large measure inasmuch as one workman can at the same time attend on at least 10 to 12 tapping machines and at all events need not continuously stand still before any one machine.

A feed trough is employed in which the nuts are thrown by a workman; who can then at once go to the next machine; in order to replenish its trough with 30 or 40 nuts in the very shortest time. By practice the workman, with only a little attention can prevent a large number of machines from running idle. A separate distributer and a stop arrangement for the nuts, which are arranged in the discharge trough, render the new machine complete in the main.

There are conditions, which make the operation of the known machines unreliable, such as the irregularities of the blank nuts in height, and the getting crosswise of the blanks in the feed-trough. These are all avoided by the present invention.

The accompanying drawing illustrates the new nut tapping machine.

Figure 1:
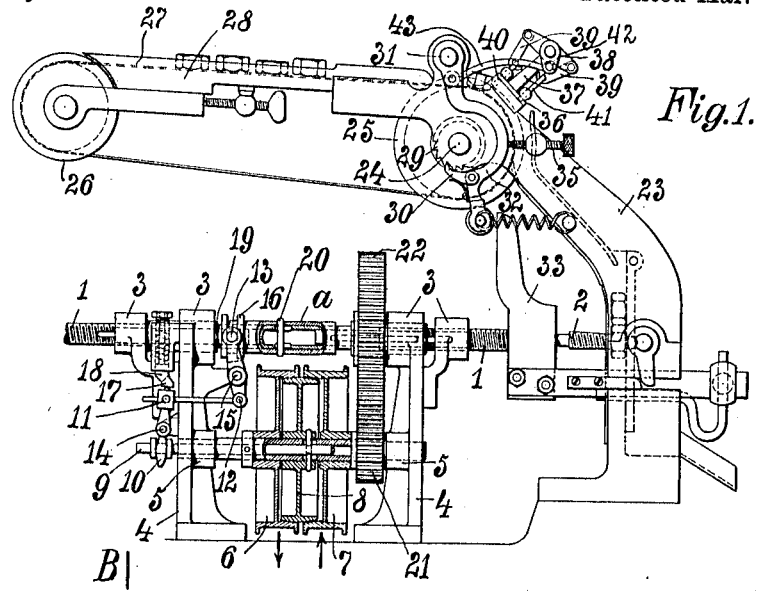
Figure 2:
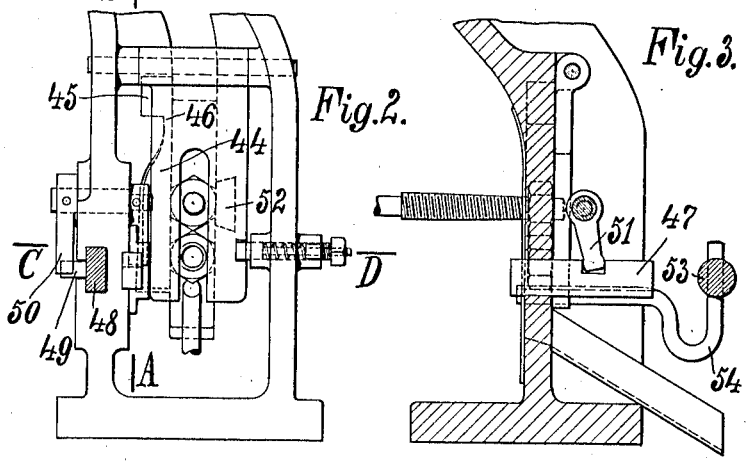
Figure 3:
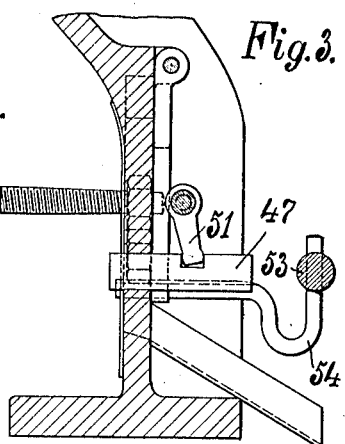
Figure 4:
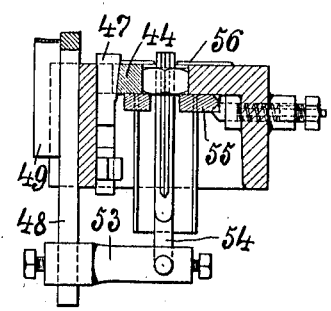

Figure 1 shows a side view of the machine partly in section, the feed contrivance is only drawn on the right side, but is in practice to be provided on the left side also as a continuation of the broken tapping spindle, so that the two arms are turned to each other. Fig. 2 shows on an enlarged scale the stop arrangement with the jaws gripping the nut, when being tapped. Fig. 3 is a section on line A—B, Fig. 2. Fig. 4 shows a plan of Fig. 2 on line C—D.

The screw tap spindle 1 in Fig. 1 is supplied with a thread, the pitch of which is the same as that of the screw tap 2; it is rotatably held by the nuts 3, which are fixed on the head stocks 4, on these stocks 4 there are the journals 5 for the shaft 9 of two pulleys 6 and 7. These pulleys are alternately driven in opposite directions and transfer their motion to the conical coupling disk 8, which is made together with the shaft 9 longitudinally movable, and is regulated by the lever-apparatus 10, 11, 12, 13, the points of support of which are provided in the pivots 14 and 15. The lever apparatus is moved by the tapping spindle by means of a cylinder 16; when the wedge shaped end 17 has passed the end of the spring pin 18, the pin 18 leaps forward again and forces the wedge-shaped end 17 into its left dead center position, so that the shaft 9 is pushed to the right side and the coupling with the pulley 7 is effected. The shifting of the adjustable cylinder 16 in the direction of the axis of the boring spindle is effected by two stops 19 and 20, which are fixed on the spindle. The rotation of the coupling disk 8 is imparted to the tapping spindle by the spur gears 21, 22; the latter being suitably splined to the spindle in the ordinary manner. The toothed gear wheel 22 engages by means of a wedge in a longitudinal groove of the tapping spindle, but is connected in such a manner that it cannot take part in its longitudinal travel.

In the upper part of the frame 23 a shaft 24 is journaled, to which is fixed a roll 25 supplied with flanges. It moves the endless band 27 which is led by the roll 26. On both sides of the band 27 are the walls 28, which are fixed to the frame, so that a trough 27, 28 with movable bottom is formed, in which the nuts are put. The roll 25 is driven by a feed wheel 29 and a pawl 30, which is fixed to a lever 32 movable around the fixed point 31. The pawl engages the feed wheel 29 and turns it, when the driver 33, which is put on the tapping spindle, so that it can follow only its longitudinal motion takes along the lever end 32 to the left on the return stroke of the right screw tap 2. A tensile spring 34 draws the lever 32 with the pawl 30 to the right toward the adjustable stop screw 35. The band 27 is a little wider than the size of the nuts, the inside width of the trough and of the rolls 25, 26 being equal to the width of the band.

The feed contrivance is set up where the band 27 is bent downward by the roll 25. A retaining plate 36 is fixed across the roll 25 to the walls of the frame 23 and bears a post 37, on which a double lever 38 is movably mounted. By means of connecting rods 39 it alternately lifts and sinks two pins 40 and 41 stuck through the plate 36. The drive of the double lever 38 is effected by the lever 42, which a connecting rod 43 joints to the pawl lever 32. When the back motion of the tapping spindle is at an end, the pin 40 is lifted, at the same time the band is moved and a nut moves to the sinking pin 41, but when the feed begins the pin 41 is lifted and allows the separated nut to fall in the feed-trough of the frame 23; at the same moment the pin 40 sinks and keeps the remaining nuts back. The feed trough in the upper part of the frame 23 now guides this separate (single) nut directly to the working place, namely on the newly cut last nut, from which the screw tap still turns out. As Figs. 2 and 4 show, the left sidewall of this structure is formed by an adjustable jaw 44, of which the upper end 45 is fixed to the frame wall, leaving the remaining part movable. In consequence of the reduced size of the part 46, it can easily be pressed in to the trough. This is effected by a wedge 47. A sliding push rod 49, fixed to a rod 48 turns a lever 50, the shaft of which bears a second lever 51 on the innerside of the frame wall, which pushes the wedge 47 forward (Fig. 3). On the part of the trough, where the nuts are held during the tapping, the wall opposite to the jaw 44 is lined with a steel-piece 52.

In order to get the newly cut nuts to fall at the right moment and at the same time to place an unthreaded nut before the screw tap a regulating piece or cross arm 53 (Fig. 4), is fixed to the rod 48, which the bent bar 54 being movable engages. The horizontal portion of this bar is longitudinally recessed and passes through the lower portion of the discharge-trough acting as a cut-off device for the nut-blanks when it is in its left hand position. When the bar moves to the right it withdraws the horizontal portion from the trough, leaving the column of blanks to be supported by the tap; the bottom nut in the column which was tapped during the previous advance of the tapping spindle dropping out. On the next movement of the bar to the left, the straight portion passes under the blank being threaded so as to support the same when the tap has completely backed out of it. The bar then supports the entire column of blanks during the next advance of the tap spindle which threads the next blanks.

The manner of working is as follows:— When the screw tap 2 in Fig. 3 begins its movement to the right, the driver 33 follows this motion and presses the jaw 44 tightly on the nut by the movement of the wedge 47 in one direction. In the other direction the driver draws the bar 54 out of the discharge through by means of the regulating piece 53 and allows the nut which has been cut to fall out of the machine. At the same time the lever 32, freed by the driver and moved by the spring 34 permits a blank nut to fall down on the one being tapped out of the distributer 40, 41. When the thread has been cut, the stop 19 disconnects the coupling disk 8 from one pulley by the lever apparatus and effects the reversal of the direction of rotation of the tapping spindle by the drive of the other belt pulley. When the screw tap 2 works out of the threaded nut, the driver 33 causes the bar 54 to close again the feed trough and the jaw 44 to release the nut being cut. The driver head 33 Fig. 1 then pushes on the lever 32 and puts the endless band and the distributer 38 in action by the engaged ratchet wheel. When the tap 2 has at length left the nut, it falls on the bar 54 and forms the support for the following nut; at the same time the stop pin 20 presses against the cylinder 16 and effects by this the reverse movement again.

From time to time the workman comes and puts a handful of blank nuts into the feed trough; in a few seconds he has distributed them all over the whole trough. By doing so he has finished attending to one machine and can go to the next.

Having now described the nature of my invention and in what manner the same is operated, what I claim is:

In a nut tapping machine a spindle having connection with the power, a feed trough arranged to feed nut blanks to the spindle, a reciprocating driver on said spindle, a sliding push rod fixed on said driver, an adjustable cross arm on said push rod and a curved rod carried on said cross arm having a horizontal portion which reciprocates across the channel in the trough, as specified.

OTTO PAUL SCHIEMENTZ. [L. S.]

Witnesses:
WM. WASHINGTON BRUNSWICK,
KURT SINGER.

---

Copies of this patent may be obtained for five cents each, by addressing the "Commissioner of Patents, Washington, D. C."